Patented July 2, 1940

2,206,622

UNITED STATES PATENT OFFICE 2,206,622

PROCESS OF DEGRADING PROTEIN PRODUCTS

Charles Weizmann, Kensington, London, England

No Drawing. Application July 12, 1937, Serial No. 153,283. In Great Britain July 16, 1936

3 Claims. (Cl. 195—27)

This invention relates to protein preparations and the hydrolysis of protein substances: it is in particular concerned with processes involving the autolysis of yeast in adequately controlled conditions with a view to producing an effective degradation of the proteinaceous fractions of vegetable or other proteinaceous materials of the kind hereinafter defined.

In the specification of U. S. application No. 32,123, filed July 18, 1935, and of which the present application is a continuation in part, now Patent No. 2,141,455, issued December 27, 1938, I have described and claimed the employment of a yeast autolysate in connection with the proteolysis of various vegetable materials including soya meal. It has now been found that such processes, that is, processes involving the hydrolysis of materials other than yeast, which materials are hereinafter defined, with the assistance of properties possessed by an active yeast autolysate, can be greatly accelerated without practically impairing the value of the resulting product.

The invention also consists in the products of proteolytic degradation in accordance with any of the foregoing statements.

In a general way the preparation of active yeast autolysate in accordance with my said prior patent and for the purpose of the present invention is as follows:

The yeast is preferably fresh moist pressed yeast and its plasmolysis is effected by addition of a relatively small quantity, say, 5 to 10 per cent. of a cell poison. For the most generally satisfactory action I have found the most suitable substances to be such as have substantial lipoid- and water-solubilities, and for the purpose of the present invention ethyl acetate has been found of special utility on account of its rapid action and the fact that it is innocuous to the proteolytic enzymes in the yeast; which enzymes or protease are of primary importance herein and are proteinase (breaking down high molecular weight proteins to peptones and polypeptides), polypeptidase (breaking down polypeptides to dipeptides), and lastly dipeptidase (breaking down dipeptides to amino-acids), all capable of acting hydrolytically to constitute the process called proteolysis. Experiment has shown the last enzyme, dipeptidase, to be particularly delicate, and in a measure this accounts for the selection herein of ethyl acetate as plasmolyser and also for the exclusion of chloroform and carbon tetrachloride which in such capacity are found or believed to destroy the said enzyme. Toluene has not the specific defect indicated, but its action is too slow for the best results, at least when used alone.

Using 5 per cent. ethyl acetate as above, at normal or room temperature, plasmolysis is completed in 5 to 10 minutes, and, while the resulting liquid is in suitable condition for autolytic processes, it is from this point that particular care is necessary. If the liquid is merely allowed to stand unattended at a temperature permitting enzymic action it becomes more and more acid due to the formation of acids by the disorganized and uncontrolled action of enzymes in the poisoned cell. The acidity reaches about pH 5 to 4.5 after about half an hour or an hour, depending on the freshness of the yeast, $CO_2$ previously present in the form of carbonate being driven out at such acidities and the phenomenon of "sparkling" takes place.

As distinct from such method, however, I do not permit the plasmolyzed yeast medium to become so acid, as such acidity is sufficient to prevent or seriously inhibit passage of enzymes into solution. On the contrary I add a 5 per cent. solution of tribasic sodium phosphate ($NaPO_4.12H_2O$); not at once the amount expected to be sufficient to neutralize the acid formed say in the following 24 hours, but gradually in such amounts as will keep the pH within the optimal range, viz., 6.3 to 6.6. Control of acidity as above may be effected in a variety of ways, but I have found electrometric titration methods of special utility.

According to one illustrative specific example: 400 g. yeast were plasmolyzed with 20 ccs. ethyl acetate, after liquefaction diluted with 400 ccs. water, stirred and the initial pH measured was found to be (544 millivolt) pH—4.9. 60.9 ccs. of 5 per cent. sodium phosphate were immediately added to obtain (610 mv.) pH 6.34. Further additions of phosphate were so regulated that the potentiometer showed always 610 mv., i. e., pH=6.34. On one occasion, overnight, the acidity increased somewhat, viz., to pH=5.8. The proteolysis was allowed to continue overnight and the acidity was again adjusted next morning. A total of 162.6 ccs. of phosphate were added over a period of 24 hours. From plasmolysis onwards the temperature was kept at or close to 36° C.

It will be understood that control of acidity, as above, may be obtained by use of an alkali, e. g., sodium carbonate, by giving continuous attention to the proteolysis and by making frequent and regular additions of calculated small amounts of the alkali to combat the tendency for the acidity to increase. This, however, is troublesome and the use of a buffering compound as, for instance, trisodium phosphate, as indicated in the example enables quite substantial additions to be made at considerable intervals without either reducing the acidity to such an extent as to injure the alkali-sensitive dipeptidase, or yet permitting within quite long unattended periods of time increase of the acidity to pH values outside the optimal pH limits.

It will be seen then that the principal requirement for proper and practical acidity control is the use of a buffering compound. Of such there are a number, but I have found the most suitable to be alkaline phosphates; and a sodium salt is chosen in view of the fact that edible substances are my ultimate aim.

The importance of my processes as illustrated above can be best appreciated by contrasting the same with a known process in which acidities of the order of pH=5 obtain in the autolysis:

A portion of fresh bakers' yeast was divided in two parts, the first being plasmolyzed and kept neutral according to my method described above; the second being mixed with one-third of its weight of water and 4 per cent. of a mixture of equal parts of toluene and chloroform, and both being kept in an incubator for a period of 48 hours. Both products were then filtered and separately adjusted to the same pH=6.37. The calculated number of ccs. corresponding to 5 g. yeast was added in each case to 30 ccs. of 4 per cent. gelatine and made up with water to 50 ccs. After 24 hours 1 cc. was taken out of each and the amino-acids formed were determined by titration in alcohol solution with 0.4 n. alcohol KOH, using thymolphthalein as indicator. The results of these comparative experiments showed the respective yields to be as 4:1.

A rapid process of autolysis can thus be provided for such that the nitrogenous contents of the yeast cells become solubilized and practically all of the nitrogenous products are obtainable in aqueous solution. The solution thus obtained is rich in vitamins and enzymes, especially proteolytic.

The efficiency of the process in respect of the solubilizing of the yeast protein, as well as the rapidity of the process, can be judged from the following example:

400 g. of bakers' yeast were liquefied by mixing with 40 ccs. of ethyl acetate; a quantity of toluene sufficient to form a protective antiseptic film over the magma were then added together with 1600 ccs. of water and the mixture thereupon incubated at 36° C. After 22½ hours' incubation with acidity control on the lines already indicated, a sample was filtered and the specific gravity of the filtrate determined approximately by hydrometer. A nitrogen estimation was also made of the filtrate in order to determine the amount of soluble nitrogenous substances. Similar observations were made at the end of 42½ hours and 89 hours. The table below gives the results obtained.

| Time of incubation | Specific gravity of filtrate | Soluble nitrogenous substances calculated as protein in the whole mixture |
|---|---|---|
|  |  | Grams |
| 22½ hours | 1.014 | 43.7 |
| 42½ hours | 1.0145 | 48.1 |
| 89 hours | 1.015 | 49.0 |

Now, the total amount of nitrogenous substances, calculated as protein, in 400 grams of the particular sample of yeast used was found to be 51 grams; the results given above, therefore, indicate that practically the whole of the protein is rendered soluble in 89 hours, and a very considerable proportion in the first 24 hours.

It will be noted, in the last example, that toluene was added. Its function here is essentially that of a powerful antiseptic, inhibiting bacterial fermentation so as to ensure unrestricted enzymatic action. Where an antiseptic addition is essential for obtaining aseptic conditions, toluene can of course be replaced by other substances, subject however to the exclusion of chloroform and others injurious to any one or more of the proteolytic enzymes of the yeast. Preferably the antiseptic is such as is not too volatile and on the other hand is capable of forming an effective sterilizing layer upon the reaction mixture; it should, if injurious in foodstuffs, be capable of expulsion in a simple way.

The autolysate may alternatively and preferably be employed for the treatment of other proteins, especially vegetal proteins and it is in such usage that the possession by the yeast autolysate or the production by the process of autolysis of a natural range of proteoclastic enzymes displays a particular advantage. Its high enzymatic activity when prepared according to the foregoing directions renders it specially suitable for such a purpose and its use to such an end enables satisfactory control to be had of the proteolysis of such other proteins and leads to high overall yields of products of notable enzymatic and vitamin activity.

Inasmuch as, in illustration of the present invention, the numbered examples later set forth herein call for the separate preparation of an active yeast autolysate, such autolysate is to be understood to be prepared in accordance with the following example:

*Preparation of autolyzed yeast*

150 grams of fresh bakers' yeast was plasmolyzed with 5 per cent. by weight of ethyl acetate and then autolyzed for twenty-four hours at room temperature; during the autolysis 150 cc. of a 7 per cent. sodium phosphate ($Na_2HPO_4 2H_2O$) solution was added to maintain the reaction at the desired pH, viz., about 6.3 to 6.6.

In general, as plasmolyzing agent I prefer to use alkyl esters, for example, ethyl acetate (as above) having a relatively high plasmolytic activity. It is of importance also, especially if a buffering compound is not used for acidity control, to effect mixing in of the alkali rapidly so as to avoid local over-concentration. I may additionally introduce before or during proteolysis an auxiliary enzyme or enzymes, with the effect of further accelerating the process, e. g. papain, or amylase from any suitable source. I contemplate such addition more especially when proteolyzing other substances besides the yeast and more especially to compensate for any reduction or shortage of enzymatic activity as may occur from various causes such as imperfection of the yeast proteolysis and/or low or not particularly suitable enzymatic content of the vegetal or other protein substance.

Also, the procedure after mixture of yeast autolysate with the magma of predigested proteinaceous material is illustrated by this, that in aseptic conditions, ensured if required by the addition of antiseptic substance, the mixture is incubated also at about 36° C. and a relatively quick proteolysis takes place, with a very high total yield. Toluene serves as a satisfactory antiseptic for the mixture.

In carrying the present invention into effect one may operate conveniently in accordance with the following specific example:

*Example 1.*—100 gms. of soya meal (preferably substantially freed of oil) is mixed with 1,000 cc. water containing 1% orthophosphoric acid, and the mixture is heated in an autoclave for a period of about two hours at about atmospheric pressure and at a temperature of about 100° C. The product is centrifuged and the extracted liquor contains about 65% of the original protein in solution: of the soluble nitrogenous matter only about 7% is in the form of amino-nitrogen. It is important to note the positive presence of some amino-acid; it is equally important to note its quite small percentage which is all that is expected and desired out of this stage of the invented process in view of subsequent actions. The solution of protein thus obtained is brought to a suitable pH value for enzymatic processes (as explained in my other patent aforesaid), mixed with a yeast autolysate in any desired proportions and the process of proteolysis is conducted in accordance with the procedure set forth in my said prior patent; but is completed in this case in about 24 hours from the start of yeast plasmolysis, i. e., the soluble protein is by that time degraded to the required extent, e. g., in order to obtain a product having in addition to an agreeable meaty flavor, marked food or medicinal properties. An important difference between the above process and that of my aforesaid prior patent is that by the substantial predigestion of soya protein, the action subsequent to the association therewith of the autolysate is (in this particular instance) wholly one of degradation or proteolysis as distinct from predigestion; the solubilizing treatment of soya is effected more rapidly with a simple aqueous liquor with or without 1% $H_3PO_4$ than by a yeast autolysate.

It will be observed that the additional step of predigestion considerably accelerates the degradation of the soya, or like protein: the ultimate products may, however, be of the same character or composition as those obtainable by my earlier method.

In the following examples as in that given above, it is to be understood that (a) the "yeast autolysate" is produced, and (b) the procedure after mixing the autolysate and the protein extractive is conducted in accordance with my aforesaid prior patent; the invention is not, however, limited in either of these senses provided the autolysate, however prepared, is of substantial proteolytic activity, and suitable conditions are provided for arriving at an end product of the desired composition.

Predigestion does not depend upon the use of an acidulated aqueous extracting agent, as appears from the following:

*Example 2.*—100 gms. of soya meal are mixed with 1,000 ccs. of water, the mixture being heated in an autoclave for about 3 hours, at a temperature of approximately 135° C. The product is centrifuged and the clear extract liquor containing approximately 60% of the original protein in solution (and about 6.3% of this in the form of amino-nitrogen) no preliminary pH adjustment being necessary is then directly mixed with yeast autolysate for further degradation.

The foregoing description relating to the treatment of soya meal is given by way of example only, and the invention can readily and with practical advantage be applied to other proteinaceous starting materials. These materials, like soya meal, are of vegetal origin, which contain about 25% and upwards of protein of relatively high molecular weight and low solubility, and which may be of a mechanically or physically refractory character. Such other materials are commonly of a kind either of no significant vitamin or enzymatic properties or the loss of whose said properties (which may sometimes occur in the conditions of predigestion) is immaterial. Soya meal may contain about 50% protein, and other vegetal substances included within the above definition are brewers' grains and the like with some 25% protein content and certain varieties of nuts, for instance, ground nut pressed cake (peanut) with the high protein content of about 60%. On account of its very high protein content of about 90%, precipitated casein, which is of animal origin is to be regarded as within the above definition. The other materials named are examples of prepared protein materials already devoid, or substantially devoid, of vitamins although valuable protein sources. It is desirable to avoid bulky substances unless these can be first reduced to a subdivided, e. g. meal-like, condition prior to the aqueous extractive or solubilizing treatment.

Again, when an acid predigesting liquor is employed, the magma may be of a more concentrated form:

*Example 3.*—50 gms. of soya meal are mixed with 150 cc. of water containing 1 gm. of orthophosphoric acid, the mixture being heated for about 2 hours in an autoclave at about 115° C. The product, after adjustment of its pH to about 6.3–6.6 is then, without being centrifuged, mixed with yeast autolysate. After about 20 hours from the start of the plasmolysis of the yeast, about 86% of the original protein is in solution, and some 35% of the soluble protein is in the form of amino-nitrogen.

Also, although phosphoric acid has been given above as the acidulating constituent of the aqueous predigesting medium, other mineral acids may be utilized if desired; and used also in higher concentrations than herein specifically stated. When acid is used, phosphoric acid is preferred over others, such as hydrochloric acid, for the principal reasons that it has no action upon the cellulosic constituents: it forms in situ on treatment with a suitable base, e. g., sodium carbonate during adjustment of pH value, an alkaline buffer salt, viz. sodium phosphate, useful (see the discussion of buffered incubation included above) for the proteolysis of the soya or like protein solution, and of a nature admissible in edible products.

The treatment of protein other than soya is illustrated by the following:

*Example 4.*—100 gms. ground nut meal (prepared from peanuts treated for the extraction of oil therefrom) are mixed with 500 cc. of water, the mixture being heated in an autoclave for about 2 hours at about 110° C. The product is directly mixed with active yeast autolysate. After about 20 hours, measured as in Example 3, some 85% of the protein is in solution and about 34% of it in the form of amino-nitrogen.

In an alternative method, in which solubilizing is effected with the protein material in a condition which is aqueous approximating to dryness, one may operate as follows:

*Example 5.*—Soya meal is mixed with water in about equal parts to form a dough which is heated in an autoclave at a temperature of about 120° C. for 2 hours, and then dried and "roasted"

in an oven at 120° for some 2 hours. The product is thereby reduced to more or less friable or powdered condition and is mixed with yeast autolysate for protein degradation.

It is desirable in all instances that the starting material, if it be not already free, or substantially free, from oil should be treated with this end in view; for otherwise the flavor of the ultimate product may be unsatisfactory and/or the presence of oil may detract from the suitability of the product as foodstuff.

I claim:

1. The method which consists in preparing an aqueous magma of vegetable materials having a high content of degradable protein with water weakly acidulated with a weak acid reactable with a basic substance to yield a buffering salt, heating said magma at a temperature of about 100°–135° C. for a short period of the order of 2–3 hours, whereby to solubilize a substantial proportion of its protein and to degrade only a small proportion to an amino-nitrogen form, thereupon mixing yeast autolysate with said magna and incubating the mixture at a temperature of about 36° C. until degradation of said solubilized protein under the action of proteolytic enzyme fractions of said autolysate has proceeded and the yield of amino-nitrogen has increased to a satisfactory degree.

2. The method which consists in preparing an aqueous magma of soya with water acidulated with phosphoric acid, heating said magna at a temperature of about 100°–135° C. for a short period of the order of 2–3 hours, whereby to solubilize a substantial proportion of its protein and to degrade only a small proportion to an amino-nitrogen form, thereupon mixing yeast autolysate with said magna and incubating the mixture at a temperature of about 36° C. until degradation of said solubilized protein under the action of proteolytic enzyme fractions of said autolysate has proceeded and the yield of amino-nitrogen has increased to a satisfactory degree.

3. The method which consists in preparing an aqueous magma of vegetable materials having a high content of degradable protein, with water weakly acidulated with an acid reactable with a basic substance to yield a buffering salt, heating said magma at a temperature of about 100°–135° C. for a short period of the order of 2–3 hours, whereby to solubilize a substantial proportion of its protein and to degrade only a small proportion to an amino-nitrogen form, thereupon mixing with said magna yeast autolysate, and said basic substance is subsequently added to adjust the pH of the magma for the proteolytic degradation stage, and incubating the mixture at a temperature of about 36° C. until degradation of said solubilized protein under the action of proteolytic enzyme fractions of said autolysate has proceeded and the yield of amino-nitrogen has increased to a satisfactory degree.

CHARLES WEIZMANN.